United States Patent [19]

Dube et al.

[11] Patent Number: 4,476,812
[45] Date of Patent: Oct. 16, 1984

[54] WATERING CUP

[75] Inventors: Maurice T. Dube; Michael W. Hart; Warren H. Hart, all of Glendale, Calif.

[73] Assignee: H. W. Hart Mfg. Co., Glendale, Calif.

[21] Appl. No.: 401,136

[22] Filed: Jul. 23, 1982

[51] Int. Cl.³ .............................................. A01K 39/02
[52] U.S. Cl. ......................................................... 119/75
[58] Field of Search .................. 119/72.5, 75; 251/284

[56] References Cited

U.S. PATENT DOCUMENTS

| | | | |
|---|---|---|---|
| 1,916,513 | 7/1933 | Jones | 119/72.5 |
| 2,845,046 | 7/1958 | Hart | 119/75 |
| 3,540,695 | 11/1970 | Taylor | 251/284 |
| 3,870,022 | 3/1975 | Hart | 119/75 |
| 3,983,844 | 10/1976 | Hart | 119/75 |

Primary Examiner—Robert P. Swiatek
Assistant Examiner—Kris R. Schulze
Attorney, Agent, or Firm—Ellsworth R. Roston; Charles H. Schwartz

[57] ABSTRACT

A watering cup has a rear wall, shaped as by ledges, to direct water downwardly into the cup in a swirling motion. A triggering arm is mounted on the cup for pivoting in accordance with the operation of the arm by the fowl. A valve disposed in the cup is operative between a normally closed position and an open position in accordance with the triggering of the arm by the fowl. Water passing through the valve is directed in a swirling movement along the rear wall of the cup to clean the rear wall. This may be accomplished by hooded portions with configurations defining converging arcuate areas at their centers and outwardly and downwardly directed channels at their peripheries. The cup has a body portion and a clamping member. The clamping member may be coupled at one end to a pipe for supplying water to the cup and is provided at the other end with fingers for retention by the opposite lateral ends of the body portion. A pivot pin extends through the clamping member for disposition on the rim of the body portion and supports the triggering arm for pivotal movement. A rocker arm is also pivotable with the pin at a position external to the body portion of the cup. The pivotal movement of the rocker and triggering arms is limited in one direction by a particular one of the fingers and in the other direction by a projection on the external surface of the cup body portion.

23 Claims, 6 Drawing Figures

WATERING CUP

This invention relates to watering cups for fowl and more particularly relates to watering cups for providing for a watering of fowl without any clogging of the water cups by particles of dirt or feed.

Fowl, and particularly chickens, have become a staple food throughout the world because they are an excellent source of nutrition and because they can be raised inexpensively and expeditiously. In order to raise the fowl properly, water has to be made available to the fowl whenever the fowl wish to dissipate their thirst.

Various articles have been provided for making water available to fowl. Some of these articles have comprised drinking cups which have included arms actuatable by the beaks of the fowl to open a valve for introducing water into the cups. These cups have generally been sucussful in making water available to the fowl. However, the fowl have tended to carry particles of dirt and feed on their beaks and to transfer these particles into the cups. Such particles of dirt and feed have sometimes caused the valves to become stuck and have occasionally prevented the walls of the cups from being as clean as might otherwise be desired. This has occasionally produced a spillover of water from the cup. Such water spillover has not been conducive to optimal sanitary conditions and has not made for happy fowl.

Watering cups have been used successfully for decades to provide water to fowl. During that extended period of time, considerable efforts have been made to eliminate the problems discussed in the previous paragraphs. Despite such efforts, the problems discussed above have persisted.

This invention provides a watering cup which eliminates the above difficulties. The cup is constructed to prevent a valve in the cup from becoming stuck in the open position by particles of dirt or feed. The cup is also constructed so that the surface of the cup adjacent the valve is cleaned of particles of dirt or feed by the flow of water through the valve. The cup is further constructed so that overflow of water from the cup is prevented.

In one embodiment of the invention, a watering cup is provided with a rear wall, shaped as by ledges, to direct water downwardly into the cup in a swirling motion. A triggering arm is mounted on the cup for pivotal movement in accordance with the operation of the arm by the fowl. Valve means are disposed in the cup and are operative between a normally closed position and an open position in accordance with the triggering of the triggering arm by the fowl. Means are disposed on the rear wall of the triggering arm and are responsive to the passage of water through the valve means for directing the water in a swirling movement along the rear wall of the cup to clean the rear wall as the water flows to the bottom of the cup. Such means may comprise hooded portions with configurations defining converging arcuate areas at their centers and further defining outwardly and downwardly directed channels at their peripheries.

The watering cup is formed from a body portion and a clamping member. The clamping member may be constructed at one end to be coupled to a pipe for supplying water to the cup. The clamping member is provided at the other end with fingers for engaging the body portion to be retained by the body portion at the opposite lateral ends of the body portion. A pivot pin extends through the clamping member for disposition on the rim of the body portion and supports the triggering arm for pivotal movement. A rocker arm is also pivotable with the pin at one end of the pin at a position external to the body portion of the cup. The pivotal movement of the rocker and triggering arms is limited in one direction by a particular one the fingers and in the other direction by a projection on the external surface of the cup body portion.

Figure 1:
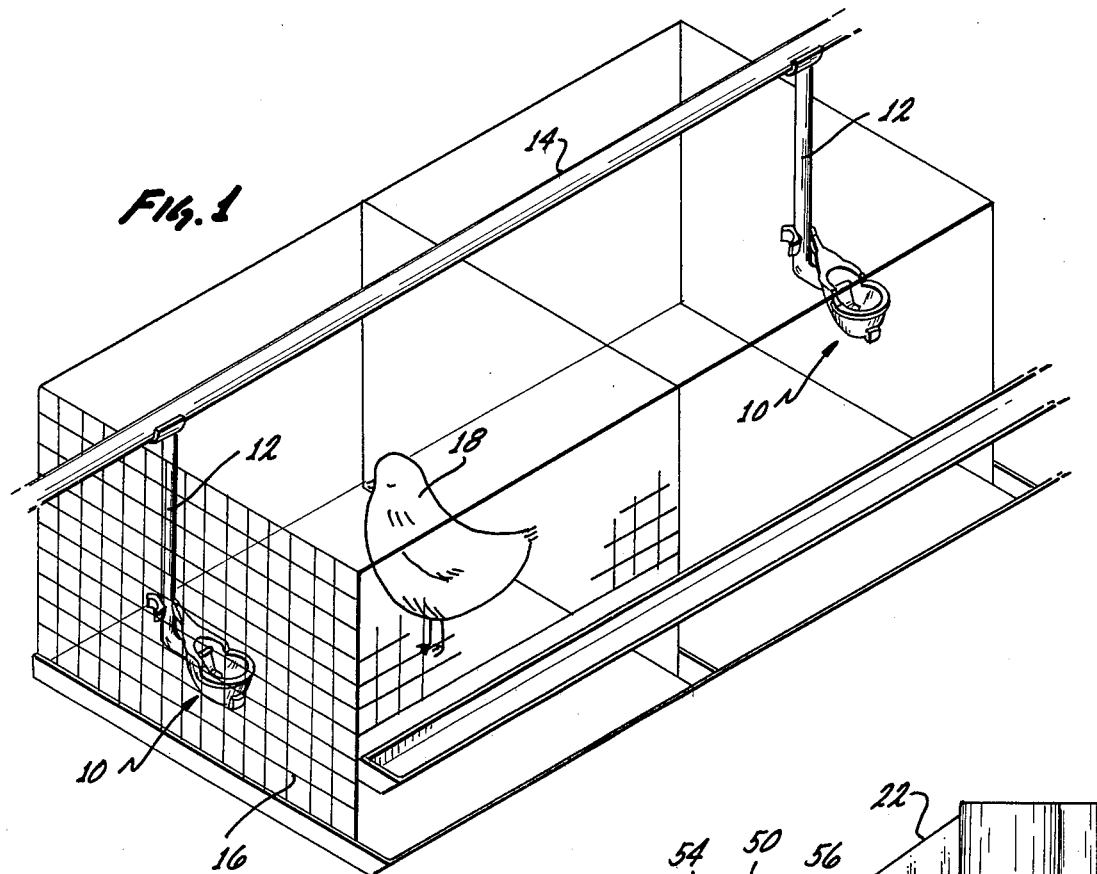
FIG. 1 is a schematic perspective view of a pen for chicks and of watering cups and of piping for introducing water to the cups.
Figure 2:
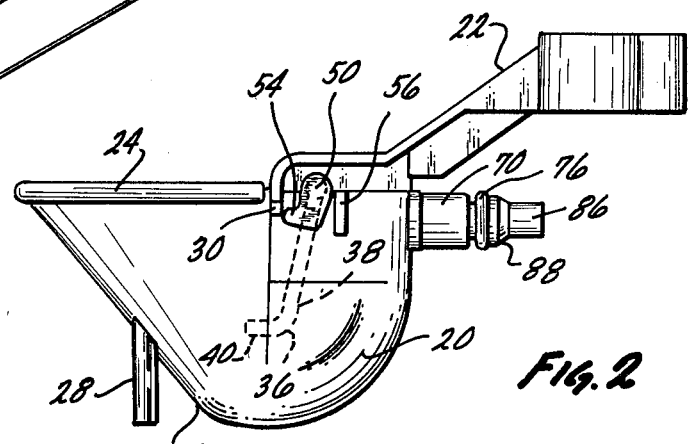
FIG. 2 is an enlarged front elevational view of one of the watering cups shown in FIG. 1.
Figure 3:
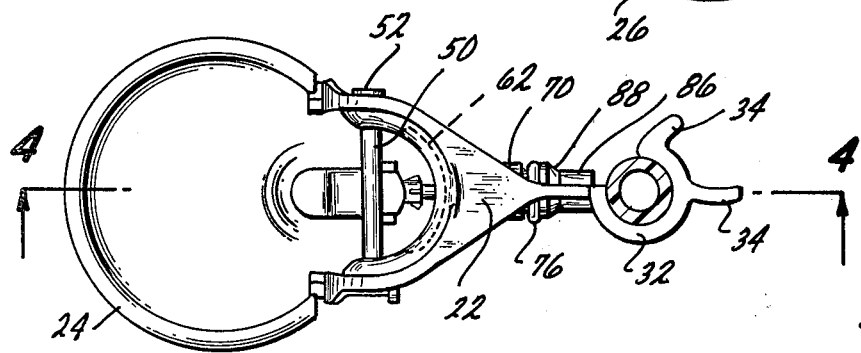
FIG. 3 is a top plan view of the watering cup shown in FIG. 2.
Figure 4:
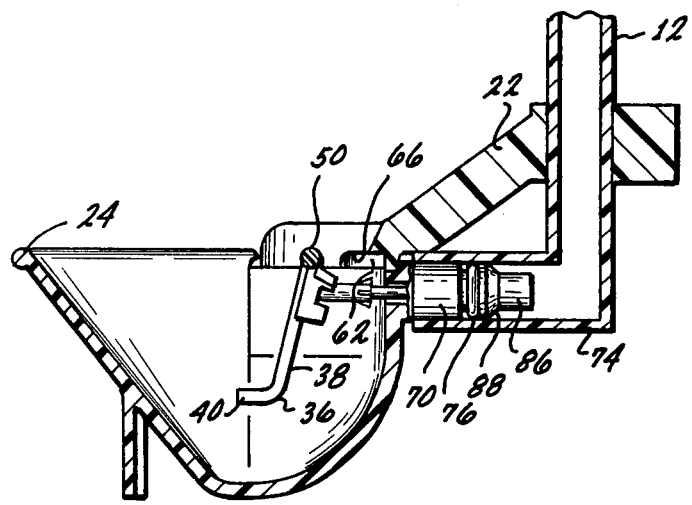
FIG. 4 is a sectional view of the cup and is taken substantially on the line 4—4 of FIG. 3.

In one embodiment of the invention, a cup generally indicated at 10 is supported on a pipe 12 for providing a controlled introduction of water into the cup. The pipe 12 in turn communicates with a line 14 for receiving water from a source (not shown). The cup 10 is disposed within a pen holding chicks 18 or other fowl.

The cup 10 includes a body portion 20 and a clamping member 22 made from a suitable material such as polypropylene. The body portion 20 is closed at the bottom and is open at the top, the opening being defined by a rim 24. The forward end of the body portion 20 is tapered to define a basin portion 26 for holding water. The tapering of the forward end enhances the ability of the chicks 18 to direct their beaks into the basin 26. A fin 28 extends downwardly from the body portion 20 at the tapered forward end of the body portion.

The clamping member 22 is disposed on the rim 24 of the body portion 20 and is clamped to the body portion by fingers 30 which extend downwardly along the body portion at the opposite lateral extremities of the body portion. The clamping member 22 may also be heat sealed to the rim 24 of the body portion 20. At its opposite end, the clamping member 22 is provided with a portion 32 which is constructed to partially encircle and to engage the pipe 12. The encircling portion 32 may be enlarged by manually gripping and operating tab portions 34 so as to facilitate the disposition of the clamping member on the pipe or the removal of the clamping member from the pipe.

A triggering arm 36 is pivotably disposed in the cup 10. The triggering arm 36 may also be made from a suitable plastic material such as polyethylene. The triggering arm 36 has a lever arm 38 extending downwardly into the cup in a substantially vertical direction.

The lever arm 38 is relatively long so as to increase the tongue arm when a chick operates the arm. The triggering arm 36 also has a tongue portion 40 at the bottom end of the lever arm 38. The tongue portion 40 extends forwardly in a transverse direction, preferably substantially perpendicular, to the lever arm 38 so that it is disposed at a position above the bottom of the basin portion 26. When the chick 18 desires water and the water level in the basin 26 is relatively low, the chick pecks at the tongue portion 40.

Figure 8:
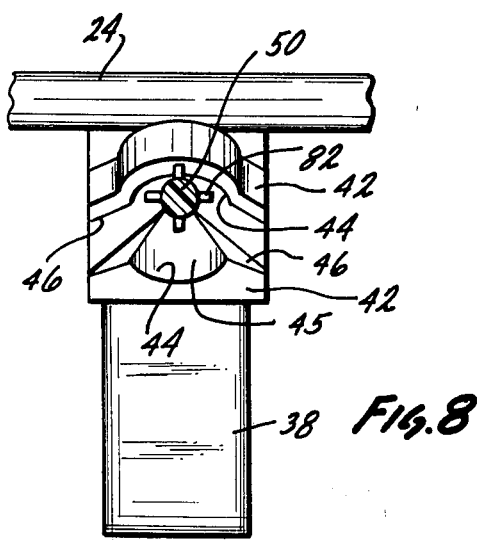
FIG. 8 is a sectional view taken substantially on the line 8—8 of FIG. 5.

Hood portions 42 (FIG. 8) are provided at the rear end of the triggering arm 36 at a position near the upper end of the lever arm 38. The hood portions 42 have a converging arcuate configuration 44 at their central portion to define a central recess 45 for receiving a stream of water. The hood portions 42 also define outwardly and downwardly directed channels 46 at their peripheries. The channels 46 communicate with the recess 45. The center of the recess 45 may be further indented as at 48.

A pin 50 made from a suitable plastic material such as polypropylene is integral with the triggering arm 36 at the top of the triggering arm. The pin 50 is provided with flange portions 52 at opposite ends. A rocker arm 54 is integral with one of the flanges 52. The pin 50 is disposed in sockets 54 in the clamping member 22 so that the flange portions 52 and the rocker arm 54 are external to the clamping member and so that the clamping member will co-operate with the flange portions 52 to retain the pin. The pin 50 rests on the rim 24 of the body portion 20 for pivotable movement of the pin, the triggering arm 36 and the rocker arm 54 relative to the body portion 24. A particular one of the fingers 30 limits the pivotable movement of the rocker 54 in one direction and a projection 56 on the body portion 24 limits the pivotable movement of the rocker arm in the opposite direction.

The upper surface of the clamping member 22 is undercut at the rear end of the clamping member to define a ledge 62 near the upper end of the clamping member. The ledge 62 is curved downwardly as at 66, at the positions of the side wall of the body portion 20, to define a path for the flow of water downwardly in a swirling motion.

A tubular portion 70 is included in a valve generally indicated at 72. The tubular member is 70 provided at the rear end of the body portion 20 at a position just below the rim 24. A sleeve 74 is disposed on the tubular portion 70 and is sealed relative to the tube as by an O-ring 76 disposed in a socket on the tubular portion. A rod 78 extends through the tubular portion 70 to a position adjacent the triggering arm 36. The rod 78 is provided with a spliced configuration as at 80 to facilitate a flow of water through the valve 72 along the splices.

Barbs 82 are provided at the forward end of the rod 78 to limit the rearward movement of the rod relative to the body portion 20. The barbs 82 are tapered in the forward direction. The rod 78 is provided with an enlarged portion 84 at positions forward of the barbs 82. A sealing member 86 is disposed on the rod 78 at the rear end of the rod. The sealing member 86 co-operates with a tapered surface 88 on the rear end of the tubular portion 70 to close the valve 72 in the normal operation of the valve.

Figure 5:
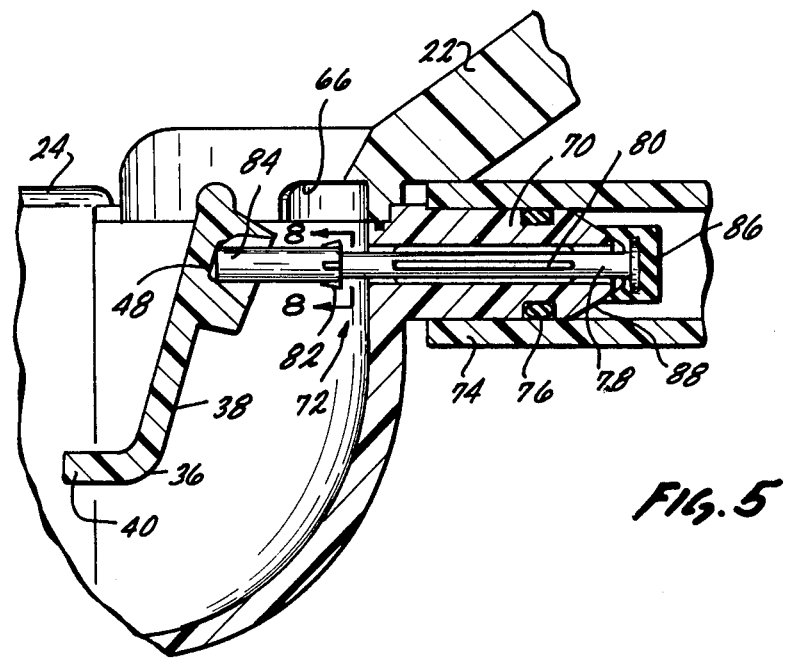
FIG. 5 is an enlarged fragmentary section view similar to that shown in FIG. 4 and particularly illustrates the construction of a pivotable triggering arm and a valve, shown in the closed position, actuatable by the pivotal movement of the arm for providing for the flow of water into the cup.
Figure 6:
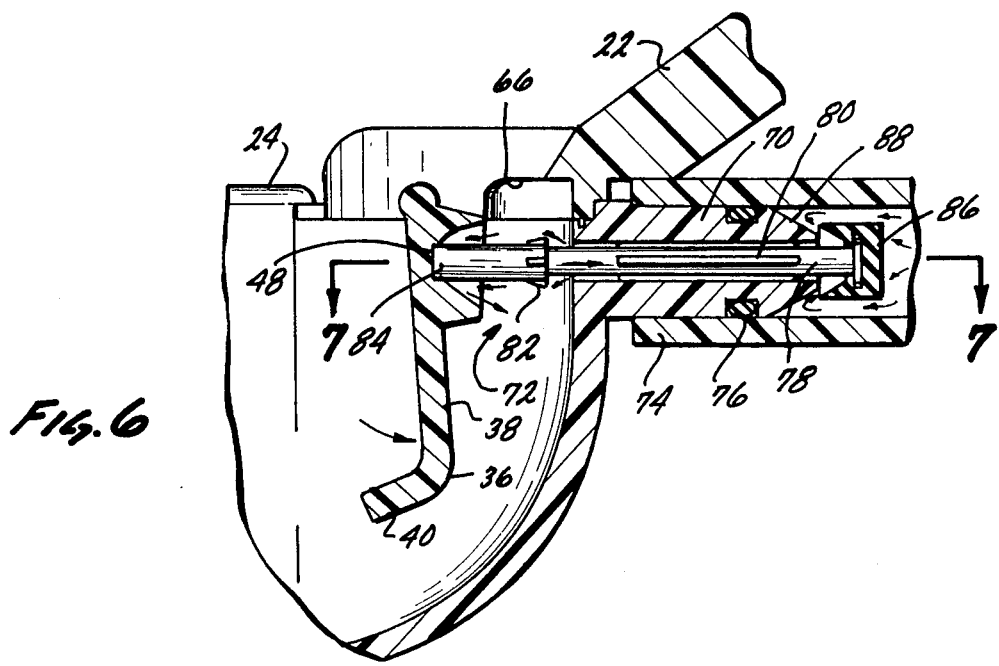
FIG. 6 is an enlarged fragmentary sectional view similar to that shown in FIG. 5 but with the valve in the open position.

The valve 72 is normally in the closed position shown in FIG. 5. This results from the action of the pressure of the water in the pipe 12. This pressure acts upon the sealing member 86 and forces the sealing member to the left in FIG. 5 against the tapered surface on the rear end of the tubular member 70. During the time that the valve 72 is closed, the chicks 18 are able to drink water from the cup 10 since water is generally disposed in the basin portion 26 at a level corresponding to the position of the tongue portion 40.

Figure 7:
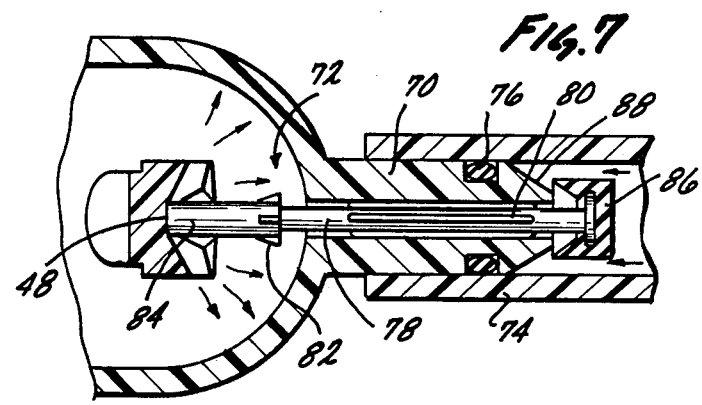
FIG. 7 is an enlarged fragmentary sectional view and is taken substantially on the line 7—7 of FIG. 6.

When the chicken 18 desires water and the water level in the cup 10 is below the level of the tongue portion 40, the chicken pecks the tongue portion. This causes the triggering arm 36 to be pivoted against the rod 78 so that the rod is moved toward the right to open the valve 72, as illustrated in FIG. 7. Water then flows through the conduit 14, the pipe 16 and the valve 72 as illustrated in FIG. 7 by the arrows directed toward the left.

The water flowing through the valve 72 is directed against the central recess 45 defined by the hood portions 42. The water then flows outwardly and downwardly through the channel 46 to positions below the ledge 62 on the clamping member 22. The water then flows downwardly on the rear end side surfaces of the body portion 20 along the path defined by the curvature 66 in the ledge 62. The water accordingly flows in a path defining a swirling motion. The swirling movement of the water produces a cleaning action on the rear wall of the body portion 24 and carries particles of dirt and feed on the rear wall to the basin portion 26 at the bottom of the cup 10. By carrying particles of dirt and feed to the basin portion 26, the particles of dirt and fed are prevented from lodging in the valve 72 and jamming the valve in either the open or closed positions.

The proper operation of the valve 72 is also assured by the inclusion of other components in and on the cup. For example, the inclusion of the rocker arm 54 and the disposition of the rocker arm on the external surface of the body portion 24 prevent the operation of the rocker arm from being impeded by particles of dirt and feed. As previously described, the co-operation of the rocker arm 54 with one of the fingers 30 and with the projection 56 limits the pivotal movement of the rocker arm 54 and the triggering arm through an arc sufficient to open and close the valve.

The construction of the valve 72 also enhances the operation of the cup 10 in providing water to the chicks 18. For example, the provision of the splines 80 on the rod 78 assures that the water will flow uniformly through the valve. The provision of the forwardly tapered barbs 82 further assures that the water will flow in a uniform manner and at a sufficiently low velocity to the central recess 44 in the triggering arm 36 so that the water will not splatter when it contacts the rear wall of the triggering arm 36.

The disposition of the pivot pin 50 in the clamping member 22 and on the rim 24 also enhances the performance characteristics of the cup. This causes the pivot pin 50 to be spaced a considerable distance above the tongue portion 40. Since the water in the cup is generally at the level of the tongue portion 40, the disposition of the pivot pin 50 at a position considerably above the tongue portion 40 prevents water from rising to the level of the pin and leaking from the cup through the area around the pin. This is facilitated by the considerable vertical height of the lever arm 38.

Figure 9:
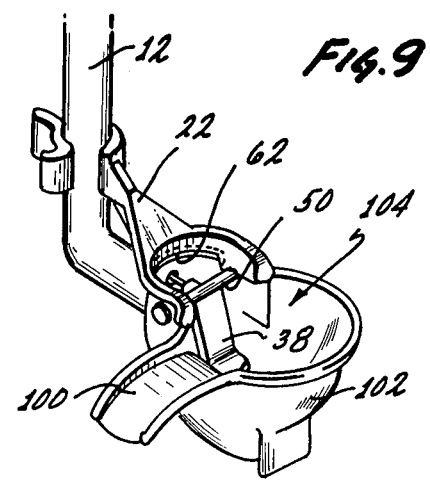
FIG. 9 is a schematic perspective view of a modified cup.

FIG. 9 illustrates a modification of the cup shown in the previous Figures and described above. In the modification shown in FIG. 9, an expanded rim 100 is provided on a body portion 102 of a cup generally indicated at 104. The expanded rim 100 extends laterally from one side of the body portion 102 so that any overflow of water from the cup to the ground will occur at positions displaced from the body portion 102 of the cup 104 and displaced from the feed trough of the cup.

Although this application has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. In combination for dissipating the thirst of fowl, a watering cup having a rear wall,
a triggering arm disposed in the cup and mounted for pivotal movement in accordance with the operation of the arm by the fowl,
valve means extending into the cup and operative between a normally closed position and an open position in accordance with the triggering of the triggering arm,
means for channeling water through the valve means in the open position of the valve means, and
means disposed on the triggering arm and responsive to the passage of the water through the valve means for controllably directing the water in a swirling movement along the rear wall of the cup to clean the rear wall of the cup as the water flows to the bottom of the cup.

2. In the combination set forth in claim 1,
the directing means being disposed on the rear wall of the triggering arm for receiving the water passing through the valve means and for redirecting the water to the rear wall of the cup.

3. In the combination set forth in claim 2,
the directing means being shaped to direct the water to the rear wall of the cup downwardly in a swirling motion.

4. In the combination set forth in claim 3,
the rear wall of the cup being shaped to facilitate a downward and swirling flow of the water for cleaning the rear wall of the cup.

5. In the combination set forth in claim 4,
the rear wall of the cup being provided with a projecting ledge and being shaped to direct the water downwardly in a swirling motion.

6. In combination for dissipating the thirst of fowl,
a cup for holding water, the cup having a rear wall,
a triggering arm supported in the cup for pivotal movement at a position near the rear wall of the cup,
valving means extending through the rear wall of the cup and operable in accordance with the pivotal movement of the triggering arm to direct water to the triggering arm, and
the triggering arm being provided with hooded portions spaced to define a recess for directing to the rear wall of the cup water passing through the valving means to the triggering arm,
the rear wall of the cup being provided with ledges shaped to direct downwardly and in a swirling motion the water flowing to the rear wall from the triggering arm.

7. In the combination set forth in claim 6,
the hooded portions being provided with configurations defining converging arcuate portions at their centers and further defining outwardly and downwardly directed channels at their peripheries.

8. In the combination set forth in claim 6,
the ledges on the rear wall of the cup being disposed near the top of the cup and being provided with downwardly curved portions near their extremities.

9. In the combination set forth in claim 8,
the hooded portions on the triggering arms being disposed at approximately the vertical levels of the ledges on the rear wall of the cup and the hooded portions being shaped to define converging arcuate portions at their centers and outwardly and downwardly directed channels at their peripheries.

10. The combination set forth in claim 9 wherein
the valving means is constructed to direct the water throughout the central area of the rear wall of the triggering arm between the hooded portions.

11. In combination for receiving water passing through a pipe to dissipate the thirst of fowl,
a body portion,
a triggering arm,
a clamping member supported on the body portion at one end to define a cup with the body portion and having at its other end a portion for support by the pipe,
a pivot pin supported by the clamping member on the body portion and supporting the triggering arm for providing for a pivotal movement of the triggering arm,
valve means supported by the body portion and responsive to the pivotal movement of the triggering arm for producing a flow of water from the pipe into the cup, p1 a rocker arm pivotable with the triggering arm,
means disposed on the body portion for limiting the pivotal movements of the triggering and rocker arms,
the rocker arm being disposed at a position external to the body portion,
the limiting means being disposed on the body portion at positions external to the cup to limit the pivotal movement of the rocker and triggering arms in opposite pivotal directions,
the body portion having a top rim, and
the clamping member including a finger extending downwardly below the top rim of the body portion and defining one of the limiting means and further providing a support for the body portion.

12. In the combination set forth in claim 11,
the triggering arm being provided with a substantially vertical portion and with a tongue disposed at the bottom of the substantially vertical portion and extending forwardly in the cup for actuation by the fowl to open the valve for the flow of water into the cup through the pipe.

13. In the combination set forth in claim 12,
the fingers on the clamping member providing for the clamping of the clamping member to the top of the body portion.

14. In combination for receiving water passing through a pipe to dissipate the thirst of fowl,
a body portion open at the top and having an upper perimeter defined by a rim,
a clamping member constructed at one end to be supported on the pipe and provided with fingers extending downwardly below the rim of the body portion and externally of the external wall of the body portion for support on the body portion, a triggering arm extending into the body portion and pivotable about a fulcrum near the rim of the body portion, a rocker arm disposed externally of the body portion and pivotable with the triggering arm and limited in its pivotable movement in a first direction by a particular one of the fingers, and valve means supported by the body portion and actuatable by the triggering arm in accordance with the pivotal movement of the triggering arm to provide for the flow of water from the pipe into the body portion.

15. The combination set forth in claim 14, including, the triggering arm having a rear surface facing the valve means and being constructed at such surface to direct the water from the valve means to the interior surface of the body portion at the rear end of the body portion and the interior surface at the rear end of the body portion being shaped to pass such water downwardly to the bottom of the cup in a swirling motion.

16. The combination set forth in claim 15, including, a projection on the body member at a position displaced from the particular finger for limiting the pivotal movement of the rocker arm in a second direction opposite to the first direction.

17. The combination set forth in claim 16 including, a pivot pin extending through the clamping member and supported on the rim of the body portion and supporting the triggering arm and the rocker arm for pivotal movement.

18. The combination set forth in claim 17 wherein:

the triggering arm is provided with a substantially vertical portion and with a tongue portion extending transversely from the substantially vertical portion at the bottom of the substantially vertical portion.

19. In combination for use in a cup for dissipating the thirst of fowl, including, a valve rod extending through the cup and movable forwardly and rearwardly in the cup;

a triggering arm including:

a first portion constructed to extend downwardly into the cup, and a tongue portion extending forwardly from the first portion at the bottom of the first portion, and hood portions disposed on the first portion of the triggering arm at a position near the top of the first portion and in enveloping relationship to the valve rod in the forward position of the valve rod and extending rearwardly to define an area for directing water from the valve means to the cup; and a pivot pin disposed at the upper end of the first portion at a position above the hood portions.

20. The combination set forth in claim 19 wherein the hood portions are shaped to define converging arcuate areas at a central position relative to the valve rod in the forward position of the valve rod and further defining outwardly and downwardly directed channels at their peripheries.

21. The combination set forth in claim 20, including, a rocker arm mounted on the pivot pin at one end of the pivot pin.

22. The combination set forth in claim 21 wherein the central channel and the outwardly and downwardly directed channels are in communication with each other.

23. The combination set forth in claim 22 wherein the outwardly and downwardly directed channels are directed downwardly at a relatively shallow angle to the horizontal.

* * * * *